US012374495B2

(12) United States Patent
Hattori et al.

(10) Patent No.: US 12,374,495 B2
(45) Date of Patent: Jul. 29, 2025

(54) LAMINATE, ELECTRONIC COMPONENT AND CAPACITOR

(71) Applicant: Panasonic Intellectual Property Management Co., Ltd., Osaka (JP)

(72) Inventors: Takayuki Hattori, Osaka (JP); Kotaro Ono, Osaka (JP); Yukihiro Shimasaki, Hyogo (JP); Hiroki Takeoka, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 161 days.

(21) Appl. No.: 18/257,064

(22) PCT Filed: Dec. 6, 2021

(86) PCT No.: PCT/JP2021/044688
§ 371 (c)(1),
(2) Date: Jun. 12, 2023

(87) PCT Pub. No.: WO2022/138105
PCT Pub. Date: Jun. 30, 2022

(65) Prior Publication Data
US 2024/0062964 A1  Feb. 22, 2024

(30) Foreign Application Priority Data

Dec. 21, 2020 (JP) ................. 2020-211658

(51) Int. Cl.
*H01G 4/224* (2006.01)
*H01G 4/32* (2006.01)
*H01G 4/33* (2006.01)

(52) U.S. Cl.
CPC ............... *H01G 4/224* (2013.01); *H01G 4/32* (2013.01); *H01G 4/33* (2013.01)

(58) Field of Classification Search
None
See application file for complete search history.

(56) References Cited

U.S. PATENT DOCUMENTS 9,688,449 B2 *  6/2017  Kaminaga .............. B65D 65/40
2010/0091425 A1 *  4/2010  Takeoka ................. H01G 4/236
                                                    361/301.4

(Continued)

FOREIGN PATENT DOCUMENTS

JP       2005035167 A  *  2/2005
JP          4973856 B2      7/2012

(Continued)

OTHER PUBLICATIONS

JP 7137326 (Year: 2022).*

(Continued)

*Primary Examiner* — Dion R. Ferguson
(74) *Attorney, Agent, or Firm* — Rimon P.C.

(57) ABSTRACT

A laminate includes a base material layer, an adhesive layer, and a clay layer. The base material layer includes a crystalline resin. The adhesive layer includes a resin different from the crystalline resin and is disposed on one face of the base material layer. The clay layer is disposed on the adhesive layer on the one face of the base material layer. The adhesive layer has a viscosity development temperature of lower than or equal to 130° C.

10 Claims, 6 Drawing Sheets

(56) References Cited

U.S. PATENT DOCUMENTS

| | | | |
|---|---|---|---|
| 2011/0185948 A1 | 8/2011 | Uemura et al. | |
| 2012/0308761 A1 | 12/2012 | Tsuda et al. | |
| 2014/0158277 A1* | 6/2014 | Tsuda | C01B 33/40 |
| | | | 156/60 |
| 2015/0239197 A1* | 8/2015 | Hosomi | B32B 1/00 |
| | | | 428/137 |
| 2018/0118904 A1* | 5/2018 | Yoda | B32B 15/085 |
| 2020/0294718 A1* | 9/2020 | Majima | H01G 4/005 |
| 2020/0347222 A1* | 11/2020 | Kawabata | H01G 4/18 |
| 2023/0326674 A1* | 10/2023 | Hattori | H01G 2/10 |
| 2024/0062964 A1* | 2/2024 | Hattori | B32B 18/00 |

FOREIGN PATENT DOCUMENTS

| | | | |
|---|---|---|---|
| JP | 2013-133236 A | | 7/2013 |
| JP | 2014022508 A | * | 2/2014 |
| JP | 5563289 B2 | | 7/2014 |
| JP | 2016-204592 A | | 12/2016 |
| JP | 2019-014609 A | | 1/2019 |
| JP | 2019-156972 A | | 9/2019 |
| JP | 6957241 B2 | * | 11/2021 |
| JP | 7137326 B2 | * | 9/2022 |
| KR | 20120130683 A | * | 12/2012 |
| WO | 2008/038808 A1 | | 4/2008 |
| WO | 2010/024378 A1 | | 3/2010 |
| WO | WO-2020175505 A1 | * | 9/2020 |

OTHER PUBLICATIONS

International Search Report dated Feb. 15, 2022 issued in International Patent Application No. PCT/JP2021/044668, with English translation.

* cited by examiner

LAMINATE, ELECTRONIC COMPONENT AND CAPACITOR

CROSS-REFERENCE OF RELATED APPLICATIONS

This application is the U.S. National Phase under 35 U.S.C. § 371 of International Patent Application No. PCT/JP2021/044688, filed on Dec. 6, 2021, which in turn claims the benefit of Japanese Patent Application No. 2020-211658, filed on Dec. 21, 2020, the entire disclosures of which Applications are incorporated by reference herein.

TECHNICAL FIELD

The present disclosure relates to laminates, electronic components, and capacitors, and specifically, to a laminate including a clay layer, and an electronic component and a capacitor which include the laminate.

BACKGROUND ART

Patent Literature 1 describes a manufacturing method of a clay film. The method includes: a first step of preparing a first clay material containing a plurality of layers including an octahedral sheet mainly including an octahedral crystal structure including an aluminum ion and/or a magnesium ion and an oxygen ion and/or a hydroxide ion and cations present between the plurality of layers; a second step of substituting at least some of the cations with lithium ions to obtain a second clay material; a third step of shaping the second clay material into a film shape to obtain a film material; and a fourth step of subjecting the film material to heat treatment to move at least some of the lithium ions into the octahedral sheet from a location between the plurality of layers.

Patent Literature 2 describes a clay film composite. The clay film composite includes: a clay film composed of a clay only or of a clay and an additive, and a water vapor barrier layer provided on at least one surface of the clay film and having a water vapor permeability of 1.0 g/m$^2$·day or less, wherein the water vapor barrier layer and the clay film are melt-bonded.

CITATION LIST

Patent Literature

Patent Literature 1: JP 4973856 B2
Patent Literature 2: JP 5563289 B2

SUMMARY OF INVENTION

It is an object of the present disclosure to provide a laminate having a good water vapor barrier property and being excellent in adhesion between a base material layer and a clay layer.

Moreover, it is an object of the present disclosure to provide an electronic component and a capacitor which include the laminate.

A laminate according to an aspect of the present disclosure includes a base material layer, an adhesive layer, and a clay layer. The base material layer includes a crystalline resin. The adhesive layer includes a resin different from the crystalline resin and is disposed on one face of the base material layer. The clay layer is disposed on the adhesive layer on the one face of the base material layer. The adhesive layer has a viscosity development temperature of lower than or equal to 130° C.

An electronic component according to an aspect of the present disclosure includes: an electronic component element; and a barrier film covering at least part of a peripheral part of the electronic component element. The barrier film includes the laminate.

A capacitor according to an aspect of the present disclosure includes the electronic component, and the electronic component element of the electronic component includes a capacitor element.

DESCRIPTION OF EMBODIMENTS (1) Overview

First of all, a background of accomplishment of a laminate of the present embodiment by the inventors will be described.

Clay, typically smectite, is left to dry, thereby forming a clay film including mineral particles in a layered arrangement and exhibiting a gas barrier property. Thus, a clay film and a clay film composite each including a clay layer, as described in Patent Literature 1 and Patent Literature 2, are proposed.

In Patent Literature 1, however, several hours have to be taken for the heat treatment at a temperature of about 350 to 500° C., which imposes a significant limitation on the case of a film being used as a base material. For example, polypropylene and the like which have a melting point close to 160° C. are not able to be used as the base material in some cases. Moreover, when a water-based binder is used as an additive, the property may be impaired due to swelling of the binder under a high temperature and high humidity.

Moreover, in Patent Literature 2, the water vapor barrier layer, which is a base material film, and the clay film are melt-bonded by thermal compression bonding, but such thermal compression bonding has to be performed at a temperature exceeding the melting point of the base material film, and therefore, steps in Patent Literature 2 lacks simplicity. Further, to improve the property, the base material film having a water vapor permeability of less than or equal to 1 g/mm$^2$·day is used, and therefore, a film which is cost-effective and which has broad utility cannot be used in some cases.

Therefore, a laminate of the present embodiment includes a base material layer including a crystalline resin having a good water vapor barrier property to reduce water vapor reaching the clay layer. Thus, a laminate having a good water vapor barrier property is obtained. Moreover, the laminate according to the present embodiment includes an adhesive layer between the base material layer and the clay layer, and therefore, a low-temperature process enables bonding the base material layer and the clay layer without melt-bonding. This improves the adhesion between the base material layer and the clay layer, thereby reducing the occurrence of an abnormality such as a crack formed in the clay layer.

(2) Details
(2-1) Laminate

Figure 1A:
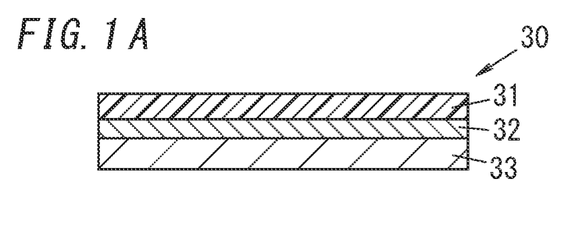
FIG. 1A is a sectional view of an embodiment of a laminate according to the present embodiment.

As shown in FIG. 1A, a laminate 30 according to the present embodiment includes a base material layer 33, an adhesive layer 32, and a clay layer 31. The base material layer 33 includes a crystalline resin. The adhesive layer 32 includes a resin different from the crystalline resin included in the base material layer 33. Moreover, the adhesive layer 32 is disposed on one face (surface) of the base material layer 33. The clay layer 31 is disposed on the adhesive layer 32 on the one face of the base material layer 33. The laminate 30 is, for example, in the shape of a film, a sheet, or a plate.

<Base Material Layer>

The base material layer 33 includes a crystalline resin. Examples of a resin used as the base material layer 33 include polyethylene, polypropylene, polyethylene terephthalate, polyamide, fluororesin, an acrylic resin, polyimide, polyethylene naphthalate, polymethylpentene, cyclo-olefin, polyarylate, polyether ether ketone, polyphenylene sulfide, a syndiotactic polystyrene-based resin, and an epoxy resin. The base material layer 33 includes one type, or a plurality of types, of the crystalline resin(s) listed in the examples above. The base material layer 33 preferably includes polypropylene having a good water vapor barrier property among the plurality of types of crystalline resins listed in the examples above. The water vapor barrier property refers to a property hardly permeable to water vapor. For example, a film made of polypropylene has a water vapor permeability of about 4 to 5 g/(m$^2$·d) and has a good water vapor barrier property.

The base material layer 33 is, for example, in the shape of a film, a sheet, a plate, or the like. The thickness of the base material layer 33 is accordingly set in consideration of an electrical insulation property, flexibility, and the like and is preferably, for example, several tens of μm, and more preferably, greater than or equal to 10 μm and less than or equal to 30 μm.

The base material layer 33 is preferably a biaxially oriented polypropylene film. Thus, the water vapor barrier property is improved as compared with the base material layer 33 made of a normal polypropylene film which is not biaxially oriented.

<Adhesive Layer>

The adhesive layer 32 is a layer for bonding the base material layer 33 and the clay layer 31. The base material layer 33 and the clay layer 31 are bonded to each other via the adhesive layer 32 and are thus excellent in adhesion. Here, "excellent in adhesion" refers to that the clay layer 31 does not peel off from the adhesive layer 32 and the base material layer 33 when evaluated by a method (cross-cut test) based on JIS K 5600-5-6.

The adhesive layer 32 includes a resin different from the crystalline resin included in the base material layer 33. For example, when the crystalline resin included in the base material layer 33 is crystalline polypropylene, the adhesive layer 32 includes a resin other than the crystalline polypropylene.

Figure 6:
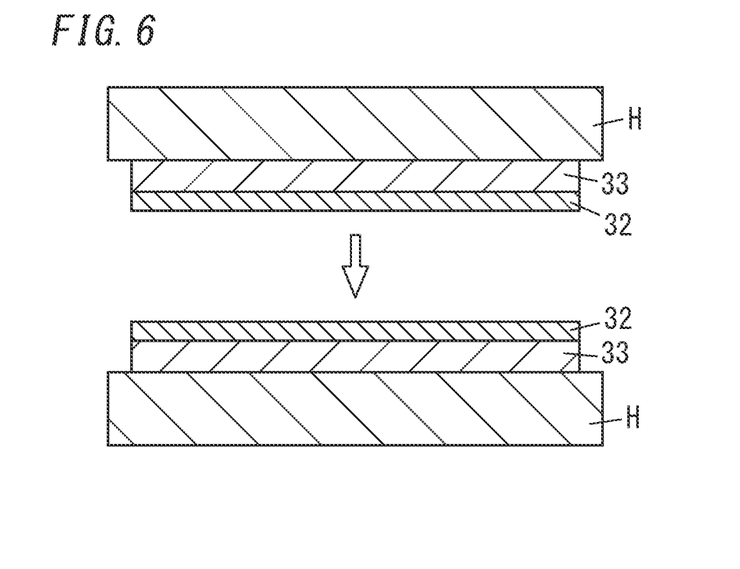
FIG. 6 is a sectional view of a measurement method of a viscosity development temperature.

The adhesive layer 32 has a viscosity development temperature of lower than or equal to 130° C. The viscosity development temperature refers to a temperature at which the adhesive layer 32 exhibits viscosity. That is, the adhesive layer 32 exhibits viscosity due to thermal welding, wherein when the viscosity is improved as compared to that before the thermal welding, a temperature at which the adhesive layer 32 is thermally welded is the viscosity development temperature. Specifically, as shown in FIG. 6, a pair of test samples each including the base material layer 33 and the adhesive layer 32 are sandwiched between a pair of heat plates H and are heated at a predetermined temperature, thereby subjecting the adhesive layers 32 to thermal compression bonding. At this time, a compression bonding force can be 0.3 MPa, and a compression bonding time can be 10 minutes. Then, if finite pull strength is measured when the pair of test samples bonded to each other are peeled from each other, the heating temperature by the heat plates H may be deemed to be the viscosity development temperature. Note that as a method of peeling the pair of test samples from each other, a 180-degree peel test based on JIS Z 0237:2009 may be employed. The viscosity development temperature of the adhesive layer 32 is preferably lower than the thermal welding temperature of the base material layer 33. In this case, heating for causing the adhesive layer 32 to exhibit the viscosity hardly melts the base material layer 33. Note that a lower limit of the viscosity development temperature of the adhesive layer 32 is not particularly limited but can be, for example, higher than or equal to 80° C. This is because, for example, forming the clay layer 31 by application by roll-to-roll processing has the problem that ease of handling is impaired if the adhesive layer 32 exhibits the viscosity at a temperature during the processing.

In order to form the adhesive layer 32 having a viscosity development temperature of lower than or equal to 130° C., the adhesive layer 32 includes a resin different from the crystalline resin included in the base material layer 33. As the resin different from the crystalline resin included in the base material layer 33, a hot melt resin is usable. The hot melt resin is a resin which is melted by heat and which reversibly hardens when the heat is removed. As the hot melt resin, a low-melting-point hot melt resin is preferable. Examples of the hot melt resin include an ethylene vinyl acetate (EVA)-based resin, an olefin-based resin, a rubber-based resin, a polyamide-based resin, a nylon-based resin, a polyurethane-based resin, and an acryl-based resin.

When the base material layer 33 is made of crystalline polypropylene, the adhesive layer 32 is preferably made of an olefin-based resin having a high affinity for the crystalline polypropylene. As the olefin-based resin having a high affinity for the crystalline polypropylene, an amorphous resin is preferably included in the adhesive layer 32. When the base material layer 33 is made of crystalline polypropylene, the adhesive layer 32 is preferably made of amorphous polypropylene having a lower crystallinity than the crystalline polypropylene. The amorphous polypropylene is, for example, polypropylene which includes no polarity group and is highly branched polypropylene or which is obtained by copolymerization of ethylene, butene, and the like. The amorphous polypropylene generally has a density of less than or equal to 0.855 g/cm³.

In the case of low melting point polypropylene having a low crystallinity, its stability is low, and therefore, a polarity group (a hydroxyl group and a carbonyl group) is likely to be generated on a surface of the adhesive layer 32 during corona treatment. Thus, the wettability when applying a process solution including clay to form the clay layer 31 is improved, thereby improving the adhesion between the clay layer 31 and the adhesive layer 32.

Moreover, the adhesive layer 32 preferably includes a resin including a polarity group. As the resin including a polarity group, modified polyolefin is usable. For example, the modified polyolefin may be modified polyolefin containing modified polypropylene as the largest content component. As the modified polyolefin, acid-modified polyolefin is usable. The acid-modified polyolefin is polyolefin modified by acid and its anhydrate, and examples of the acid include maleic acid, maleic acid anhydride, fumaric acid, citraconic acid, citraconic anhydride, mesaconic acid, crotonic acid, itaconic acid, itaconic acid anhydride, aconitic acid, and aconitic acid anhydride. As the acid-modified polyolefin, carboxylic acid anhydrate-modified polyolefin is usable, and examples of the acid-modified polyolefin include maleic acid anhydride-modified polyolefin, acrylic acid-modified polyolefin, and imine-modified polyolefin. In the case of the modified polyolefin, the polarity group is present due to modification even if the crystallinity is high. Thus, the wettability when applying a process solution including clay to form the clay layer 31 is improved, thereby improving the adhesion between the clay layer 31 and the adhesive layer 32.

As explained above, the laminate 30 according to the present embodiment includes the adhesive layer 32 as explained above, and therefore, the adhesion of the clay layer 31 to the adhesive layer 32 and the base material layer 33 is high without thermally welding the clay layer 31 and the base material layer 33. In particular, when the clay layer 31 is formed, heating the adhesive layer 32 at a temperature higher than or equal to the viscosity development temperature further improves the adhesion between the clay layer 31 and the adhesive layer 32, which reduces falling of, and damage on, the clay layer 31.

The thickness of the adhesive layer 32 is not particularly limited, but in consideration of performances such as bonding strength, adhesion, and ease of formation, the thickness is preferably less than or equal to 5 μm, and more preferably less than or equal to 1 μm.

<Clay Layer>

The clay layer 31 includes clay and has a layer shape. In the present disclosure, clay is an aggregate of plurality of mineral particles 311. The clay may include a small amount of water in the aggregate of the plurality of mineral particles 311. The mineral particles 311 include at least one type of mineral selected from the group consisting of mica, vermiculite, montmorillonite, iron montmorillonite, beidellite, saponite, Hectorite, stevensite, and nontronite. Among them, the montmorillonite, which is a high moisture-resistant clay material, is preferably included in the mineral particles 311.

In the crystal structure of montmorillonite, a unit crystal including tetrahedral structures and an octahedral structure sandwiched between the tetrahedral structures is defined as a unit layer, where the octahedral structure includes Al (aluminum atom) at its center, and the tetrahedral structures each include Si (silicon atom) at its center. Specifically, some of trivalent Al are substituted with bivalent Mg or Fe, and the unit layer is thus negative charged. Therefore, for electric charge compensation, a cationic hydrate, such as $Na^+$ or $Ca^{2+}$, is present in the crystal structure. When the montmorillonite is dispersed in water, hydration of a cationic portion of the montmorillonite advances, and the montmorillonite is likely to be separated in the unit of unit layers. Thus, the montmorillonite is dispersed in water, and thereby, the montmorillonite is easily separated into unit layers. Thus, the montmorillonite is easily contained in the clay layer 31 in a state where the montmorillonite is separated into the unit layers, and a labyrinthine structure including the mineral particles 311 is easily formed in the clay layer 31.

In the montmorillonite, ion exchange of interlayer exchangeable cations with other inorganic and other organic cations is possible. Thus, imparting an affinity for an organic solvent and intercalation of various compounds between the layers are possible. Moreover, a hydroxyl group is present on an end face of a crystal of the montmorillonite, and therefore, modification by various types of silylation agents is possible. In an attempt to achieve a high moisture-resistance of the clay layer 31, the clay layer 31 is desirably hydrophobized. For example, an exchangeable cation (e.g., $Na^+$) has a high affinity for water, and if the exchangeable cation is present between the layers, the exchangeable cation is likely to be disadvantageous to hydrophobizing of the clay layer 31. Therefore, substituting the exchangeable cation with Li and a proton is considered. For example, when the montmorillonite is subjected to the heat treatment, ions move to an inside, and a surface, of the crystal, and the clay layer 31 is thus easily hydrophobized.

Figure 1B:
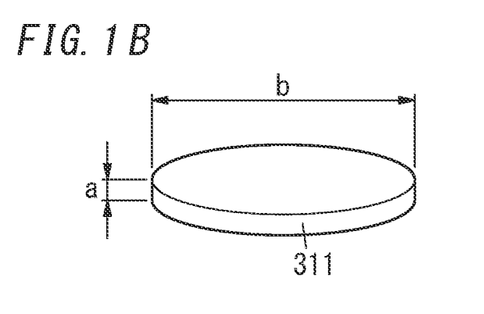
FIG. 1B is a schematic perspective view of an example of a mineral particle.
Figure 1C:
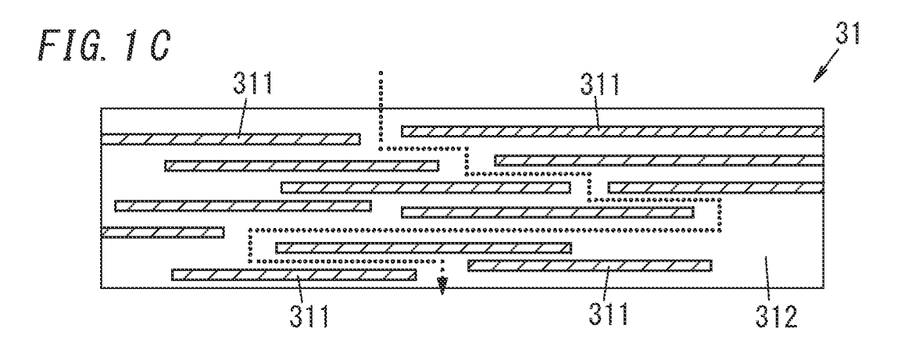
FIG. 1C is a schematic sectional view of an example of a clay layer.

FIG. 1B shows a schematic perspective view of one mineral particle 311. In the present embodiment, the mineral particle 311 is a particle having a plate shape or a flake shape. That is, the mineral particle 311 is a particle shaped such that a thickness a is smaller than a lateral width b. Here, the lateral width b is a dimension at the longest part of the mineral particle 311 when the mineral particle 311 is viewed from the front (viewed from straight on in a thickness direction defined with respect to the mineral particle 311). When the mineral particle 311 has, for example, a circular disk shape, the diameter is the lateral width b. The thickness a is a dimension in a direction orthogonal to the lateral width b and is a dimension between two opposing faces of the mineral particle 311.

In the present embodiment, the mineral particle 311 has a high aspect ratio. That is, an aspect ratio defined by "lateral width b/thickness a" is high. The aspect ratio is obtained by measuring the thickness a and the lateral width b of the mineral particle 311. The thickness a is, for example, measured by using a transmission electron microscope (TEM), but the thickness of a single layer of the mineral particle 311 is substantially uniform for each type, and therefore, there is no need to measure a large amount of mineral particles 311. For example, in the case of the montmorillonite, the thickness a is about 1 nm. The lateral width b is, for example, measured by using an atomic force microscopy (AFM). A planar part of the mineral particle 311 is observed, and the longest dimension is estimated as the lateral width b.

FIG. 1C shows a schematic sectional view of the clay layer 31. The clay layer 31 contains the mineral particles 311 and a binder 312. That is, the clay layer 31 may include the mineral particles 311 and the binder 312 or may contain the mineral particles 311, the binder 312, and other additives. The binder 312 includes one or more types of materials selected from the group consisting of polyethylene, polypropylene, polyethylene sulfide, polyimide, polyamide, polyethylene terephthalate, an epoxy resin, a fluororesin, a polyester resin, a polyurethane resin, an acrylic resin, a phenoxy resin, polyoxymethylene, and polyvinyl alcohol. Moreover, the binder 312 may be a binder resin usable as a coating material or slurry varnish. Among them, the polyamide, the polyimide, the polyurethane resin, the epoxy resin, or the phenoxy resin are preferable as the binder 312 in consideration of the ease of formation of the clay layer 31 and the adhesion to the mineral particle 311. Moreover, hardeners (cross-linking agents) suitable for the resins explained above may be used. In this case, the binder 312 is made of a cross-linked resin, and the moisture resistance of the clay layer 31 may be improved.

The clay layer 31 includes the binder 312 and the plurality of mineral particles 311 dispersed in the binder 312. The mineral particles 311 are dispersed in a state where the thickness direction defined with respect to the mineral particles 311 substantially coincides with a thickness direction defined with respect to the clay layer 31. Between the plurality of mineral particles 311 adjacent to each other in the thickness direction, a gap is provided, and the gap is filled with the binder 312. Moreover, between a plurality of mineral particles 311 adjacent to each other in a direction orthogonal to the thickness direction, a gap is also provided, and the gap is filled with the binder 312. Thus, the clay layer 31 has a structure like a labyrinth in which the gaps between the plurality of mineral particles 311 are formed as paths (labyrinthine structure). That is, in the clay layer 31, the plurality of mineral particles 311 are dispersed in a state where the plurality of mineral particles 311 are randomly located in the width direction while the thickness direction defined with respect to the plurality of mineral particles 311 coincides with the thickness direction defined with respect to the clay layer 31. Therefore, the gaps between the mineral particles 311 adjacent to each other are formed like zigzag paths. Thus, when moisture W permeates the clay layer 31 in the thickness direction, the moisture W cannot move linearly but has to move in a zig-zag manner through the gaps between the mineral particles 311 adjacent to each other (see dotted line in FIG. 1C). Thus, the clay layer 31 is hardly permeable to the moisture W as compared with a resin layer (layer including only the binder) including no mineral particle, and even when the thickness of the laminate 30 is reduced, the moisture resistance performance of the capacitor 10 can be secured. For example, even when the clay layer 31 is a clay layer having a thickness of several μm to several tens of μm, a capacitor 10 having a moisture resistance performance equivalent to a resin layer having a thickness of 2 mm and including only an epoxy resin is obtained. Thus, the capacitor 10 of the present embodiment may have a moisture resistance performance 1000 or more times that of a laminate including only a resin.

The theoretical formula of the labyrinthine structure of the clay layer 31 is shown by the following formula (1).

$$P/P0=(1-\Phi)/(1+0.5A\Phi) \quad (1)$$

In the formula (1), "P/P0" is the specific permeability, Φ is the volume fraction of the mineral particles 311 in the clay layer 31, and A is the aspect ratio of the mineral particle 311.

The smaller the value of "P/P0", the less permeable the clay layer 31 is to the moisture, and the larger the value of "P/P0", the more permeable the clay layer 31 is to the moisture. Thus, in the formula (1), the larger the value of Φ, the more difficultly the moisture permeates the clay layer 31, and the smaller the value of Φ, the more easily the moisture permeates the clay layer 31. Moreover, in the formula (1), the larger the value of A, the more difficulty the moisture permeates the clay layer 31, and the smaller the value of A, the more easily the moisture permeates the clay layer 31. Thus, in order to obtain the laminate 30 hardly permeable to the moisture to improve the moisture resistance performance of the capacitor 10, the volume fraction of the mineral particles 311 in the clay layer 31 is preferably increased, and moreover, the content of the mineral particles 311 having a high aspect ratio is preferably increased.

The aspect ratio of the mineral particle 311 is preferably greater than or equal to 20. In order to obtain the clay layer 31 hardly permeable to the moisture, the mineral particles 311 having a further increased aspect ratio is preferably used, but the range described above is preferable when other performances of the clay layer 31, for example, the strength, adhesion, ease of formation, and the like of the clay layer 31, are also taken into consideration. The aspect ratio of the mineral particle 311 is more preferably greater than or equal to 100, and much more preferably greater than or equal to 150. Note that an upper limit of the aspect ratio of the mineral particle 311 is not particularly limited but is accordingly set in consideration of the dispersibility of the mineral particles 311 in the clay layer 31 and the like.

Moreover, as the mineral particles 311, high-aspect-ratio materials and low-aspect-ratio materials may be used in combination. In this case, the low-aspect-ratio materials (small-diameter mineral particles) easily enter between the high-aspect-ratio materials, thereby improving the filling factor of the mineral particles 311 in the clay layer 31. When both the high-aspect-ratio materials and the low-aspect-ratio materials are used, the high-aspect-materials preferably amount to at least half or more of the total amount of the mineral particles 311 included in the clay layer 31.

The content percentage of the mineral particles 311 in the clay layer 31 is preferably greater than or equal to 50% by mass. For example, when the clay layer 31 includes the mineral particles 311 and the binder 312, the content percentage of the mineral particles 311 is preferably greater than or equal to 50% by mass and less than or equal to 95% by mass with respect to the total amount of the clay layer 31, and the content percentage of the binder 312 is preferably greater than or equal to 5% by mass and less than or equal to 50% by mass with respect to the clay layer 31. Thus, while performances, such as the strength, adhesion, and ease of formation, of the clay layer 31 are secured, the clay layer 31 hardly permeable to moisture is easily obtained.

The thickness of the clay layer 31 is preferably greater than or equal to 0.5 μm and less than or equal to 5 μm. In order to reduce the permeation amount of moisture through the clay layer 31, the thickness of the clay layer 31 is preferably increased, but the range is preferable in consideration of performances, such as the strength, adhesion, and ease of formation, of the clay layer 31. The thickness of the clay layer 31 is more preferably greater than or equal to 1.0 μm and less than or equal to 3 μm.

Note that the clay layer 31 not only has a low moisture permeability but also has a low gas permeability, and therefore, the laminate 30 easily secures the gas barrier property.

<Manufacturing of Laminate>

The laminate 30 is manufactured by forming the adhesive layer 32 on a surface of the base material layer 33, and by forming the clay layer 31 on a surface of the adhesive layer 32.

The adhesive layer 32 is obtained by: supplying a process solution including a resin constituting the adhesive layer 32 to the surface of the base material layer 33; and drying the process solution on the surface of the base material layer 33. The process solution is obtained by dispersing or dissolving the resin constituting the adhesive layer 32 in a solvent. Examples of the solvent include water, an organic solvent, and a mixed catalyst thereof, but in terms of ease of handling, for example, in a waste solution process, the solvent is preferably water.

The process solution may be supplied to the surface of the base material layer 33 by a coating method and an immersion method such as gravure application, roll coating, die coating, brush coating, spraying, and dipping. In this case, even when the surface of the base material layer 33 is uneven, the process solution is easily supplied along the surface, and the adhesive layer 32 is easily formed. To dry the process solution, natural drying, heat drying, or the like may be employed.

The clay layer 31 is obtained by supplying a process solution including the mineral particles 311 and the binder 312 to the surface of the adhesive layer 32 and by drying the process solution on the surface of the adhesive layer 32. The process solution includes a solvent, and the mineral particles 311 and the binder 312 which are dispersed in the solvent. Examples of the solvent include water, an organic solvent, and a mixed catalyst thereof, but in terms of ease of handling, for example, in a waste solution process, the solvent is preferably water.

To supply the process solution to the surface of the adhesive layer 32, a coating method, such as brush coating and spray coating, or an immersion method, such as dipping may be employed. In this case, even when the surface of the adhesive layer 32 is uneven, the process solution is easily supplied along the surface, and the clay layer 31 is easily formed. To dry the process solution, natural drying, heat drying, or the like may be employed.

The manufacturing method as explained above can implement the clay layer (layer including a mineral(s)) 31 which can exhibit high moisture resistance even in the case of a thin film (several to several tens of μm), and thus, the manufacturing method as explained above can secure the moisture resistance performance of the laminate 30.

After the adhesive layer 32 is formed on the base material layer 33, and before the clay layer 31 is formed, the adhesive layer 32 is preferably subjected to corona treatment. This forms a polarity group (hydrophilicity functional group) on the surface of the adhesive layer 32, thereby improving the adhesion between the adhesive layer 32 and the clay layer 31. The corona treatment is performed by causing corona discharge in air. The corona discharge causes an oxygen molecule to dissociate into oxygen ions and oxygen radicals. The oxygen ions and the oxygen radicals chemically react with each other on the surface of the adhesive layer 32 and consequently generate the hydrophilicity functional group on the surface of the adhesive layer 32. Examples of the hydrophilicity functional group include a carbonyl group and a hydroxyl group.

The laminate 30 preferably includes an aluminum layer or a polyvinyl alcohol layer on the other face. The other face refers to a surface, on which the adhesive layer 32 and the clay layer 31 are not provided, of two faces aligned in the thickness direction defined with respect to the base material layer 33. In other words, the laminate 30 preferably includes an aluminum layer or a polyvinyl alcohol layer disposed on an opposite surface of the base material layer 33 from the adhesive layer 32 and the clay layer 31. This further reduces the moisture permeability of the laminate 30.

(2-2) Electronic Component

As shown in FIGS. 2A to 2D, an electronic component 1 according to the present embodiment includes an electronic component element 2 and a barrier film. The barrier film includes the laminate 30. That is, the laminate 30 including the base material layer 33, the adhesive layer 32, and the clay layer 31 is used as the barrier film.

The electronic component element 2 is a component or a portion for exhibiting a function for which the electronic component 1 is intended. The electronic component element 2 includes external electrodes 24 at both ends.

The laminate 30 has a function of protecting the electronic component element 2. The laminate 30 has a function of protecting the electronic component element 2 from moisture. The laminate 30 may further have a function of protecting the electronic component element 2 from heat, light, electromagnetic wave, impact, chemicals, and the like. The laminate 30 covers at least part of a peripheral part of the electronic component element 2. The laminate 30 covers, for example, the entirety of the electronic component element 2 except for parts where the external electrodes 24 are disposed. The laminate 30 may be disposed in contact with the surface of the electronic component element 2.

The laminate 30 is preferably arranged such that the clay layer 31 faces the electronic component element 2. That is, the laminate 30 preferably covers the peripheral part of the electronic component element 2 such that the clay layer 31 is located on an inner side (a side close to the electronic component element 2) when viewed from a location where the base material layer 33 is present. In the laminate 30, the clay layer 31 has higher adhesion to the electronic component element 2 than the base material layer 33. Thus, arranging the laminate 30 such that the clay layer 31 faces the electronic component element 2 facilitates adhesion of the clay layer 31 to the electronic component element 2, thereby easily reducing moisture entering the electronic component element 2.

The electronic component 1 according to the present embodiment may further include an exterior resin layer 4 covering the electronic component element 2 and the laminate 30. The exterior resin layer 4 has a function of protecting the electronic component element 2 and the laminate 30 from moisture. Moreover, the exterior resin layer 4 may have a function of protecting the electronic component element 2 and the laminate 30 from heat, light, electromagnetic wave, impact, chemicals, and the like. The exterior resin layer 4 includes one or both of a case (container) and a mold resin.

The electronic component 1 according to the present embodiment may further include bus bars 6. The bus bars 6 are terminals that electrically connect the electronic component 1 to a circuit board or the like. Each bus bar 6 has one end (base end) electrically and mechanically connected to a corresponding one of the external electrodes 24 of the electronic component element 2. Each bus bar 6 has one end (tip end) located at an outer side of the exterior resin layer 4. Each bus bar 6 is made of, for example, copper or a copper alloy and has a plate shape. The electronic component 1 of the present embodiment includes a pair of bus bars 6, and the tip end of each bus bar 6 protrudes outward (e.g., upward) from the same face (e.g., upper face) of the exterior resin layer 4 but is not limited to such shape and structure.

The electronic component 1 according to the present embodiment includes the clay layer 31 containing clay in the laminate 30 covering the electronic component element 2, and therefore, the amount of moisture permeating the laminate 30 is easily reduced as compared with a resin layer which is made of a resin alone and which has the same thickness as the clay layer 31. Thus, moisture that reaches the electronic component element 2 from an outside of the electronic component 1 is reduced, and the moisture is less likely to affect the electronic component element 2, and thus, the electronic component 1 excellent in the moisture resistance performance is easily obtained. Moreover, the clay layer 31 can be formed on the surface of the base material layer 33 by a simple means such as application, and thus, the manufacturing steps of the electronic component 1 are not likely to be complicated, thereby easily reducing cost.

(2-3) Capacitor

The case of the electronic component 1 being the capacitor 10 will be described below. The electronic component 1 which is the capacitor 10 includes a capacitor element 20 as the electronic component element 2. That is, the electronic component element 2 in the capacitor 10 is the capacitor element 20.

As the capacitor element 20, various types of capacitor elements are used in accordance with the type of the capacitor 10. In the present embodiment, examples of the capacitor 10 include a film capacitor, a ceramic capacitor, and an electrolytic capacitor. Among them, the capacitor 10 is preferably the film capacitor and is particularly preferably a film capacitor including a wound capacitor element 20. In this case, the laminate 30 can be wound around the capacitor element 20 by using a device and a procedure similar to those for manufacturing the wound capacitor element 20, and thus, the capacitor element 20 having the laminate 30 wound therearound can be easily manufactured. Note that the capacitor element 20 may be a stacked film capacitor.

The capacitor element 20 includes the external electrode 24 at each of both its ends in the axial direction thereof. The external electrodes 24 are preferably formed by thermal spraying of a metal material. Moreover, the external electrodes 24 preferably contain greater than or equal to 50 wt. % tin. This type of external electrodes 24 are generally formed by thermal spraying of zinc in many cases, but the external electrodes 24 made of zinc are more likely to be porous and may allow entry of moisture. Therefore, in the present embodiment, the content percentage of tin in the external electrodes 24 is increased, and thereby, a metal structure constituting the external electrodes 24 becomes dense, thereby making it difficult for moisture to pass through the external electrode 24 to reduce the moisture entering the capacitor element 20. Moreover, increasing the content percentage of tin in the external electrode 24 makes the metal structure included in the external electrode 24 dense, thereby increasing the adhesion between the laminate 30 and the external electrode 24 to further reduce moisture entering the capacitor element 20. The content percentage of tin in the external electrode 24 is at least within the range of from greater than or equal to 50 wt. % to less than or equal to 100 wt. %.

The laminate 30 is a barrier film. That is, the laminate 30 has a function of protecting the capacitor element 20 from moisture. The laminate 30 may further have a function of protecting the capacitor element 20 from heat, light, electromagnetic wave, impact, chemicals, and the like.

As shown in FIGS. 2A to 2D, the laminate 30 covers at least part of a peripheral part of the capacitor element 20. The peripheral part of the capacitor element 20 refers to a part of the capacitor element 20 around an axis provided that the axis is a direction in which the pair of external electrodes 24 face each other. When the capacitor element 20 is substantially circularly columnar, the laminate 30 is arranged to face a circumferential surface of the capacitor element 20. Thus, the laminate 30 covers the entirety of the capacitor element 20 except for parts where the external electrodes 24 are disposed. That is, the capacitor element 20 is almost entirely covered with the laminate 30 except for the parts where the external electrodes 24 are disposed. Thus, moisture hardly enters the capacitor element 20 from the entire peripheral part, thereby improving the moisture resistance performance of the capacitor 10. In particular, the circumferential surface (surface around the axis) has a larger area than the end surface (surface in the axial direction) of the capacitor element 20 in many cases, and therefore, the laminate 30 is preferably disposed to surround at least the circumferential surface of the capacitor element 20. As explained above, the laminate 30 is disposed to cover at least part of the peripheral part of the capacitor element 20. As used herein, "at least part" preferably means, for example, greater than or equal to 80% of the surface area of the outer surface of the capacitor element 20 except for the external electrode 24.

The laminate 30 is preferably arranged to form a plurality of layers on the peripheral part of the capacitor element 20. That is, a plurality of laminates 30 overlapping each other in the thickness direction are preferably disposed on the peripheral part of the capacitor element 20. In this case, the plurality of clay layers 31 are stacked on each other, and the moisture resistance performance of the capacitor 10 is improved as compared with the clay layer 31 which is a single layer. Moreover, a clay layer 31 may have a defect such as a pin hole, but another clay layer 31 overlapping the clay layer 31 covers the defect, and therefore, the moisture resistance performance of the capacitor 10 is less likely to be impaired.

The exterior resin layer 4 covers at least part of the capacitor element 20 and the laminate 30. The exterior resin layer 4 preferably covers the entirety of the capacitor element 20 and the laminate 30, and in this case, the entirety of the capacitor element 20 and the laminate 30 is sealed by the exterior resin layer 4. The clay layer 31 and the exterior resin layer 4 are stacked on each other. That is, the clay layer 31 and the exterior resin layer 4 are disposed to face each other in the thickness direction defined with respect to the laminate 30. The thickness of the exterior resin layer 4 is preferably greater than the thickness of the clay layer 31. Thus, the clay layer 31 which has a small thickness and which easily breaks is easily protected by the exterior resin layer 4. The thickness of the exterior resin layer 4 is preferably greater than or equal to 1 mm and less than or equal to 6 mm Thus, in addition to the clay layer 31, also the exterior resin layer 4 easily reduces the moisture permeability of the clay layer 31, thereby improving the moisture resistance performance of the capacitor 10. The thickness of the exterior resin layer 4 is preferably greater than or equal to 1 mm and less than or equal to 4.5 mm, and more preferably greater than or equal to 1 mm and less than or equal to 3 mm.

Examples of the resin included in the exterior resin layer 4 include an epoxy-based resin, an unsaturated polyester resin, and a polyimide resin, and the epoxy resin is preferable in consideration of the moldability and the like when the exterior resin layer 4 covers the capacitor element 20. Moreover, the exterior resin layer 4 may be made of only the resin, or the exterior resin layer 4 may be made of a composite material including the resin and a filler. In this case, the filler may be, for example, silica, and the content of the filler with respect to the total amount of the exterior resin layer 4 may be greater than or equal to 1% by mass and less than or equal to 99% by mass.

Figure 2A:
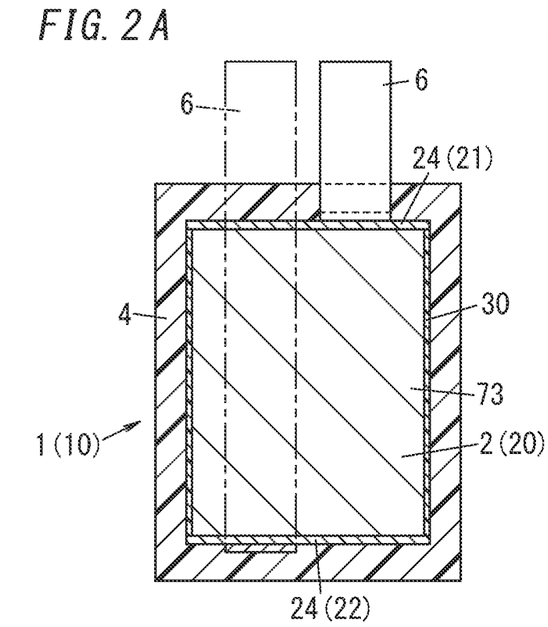
FIGS. 2A to 2D are sectional views of an embodiment of an electronic component according to the present embodiment.
Figure 2B:
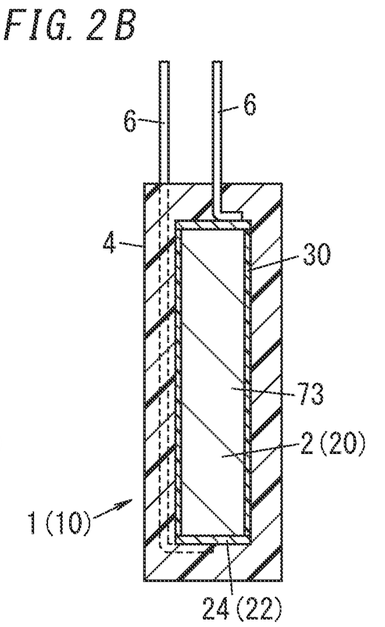
Figure 2C:
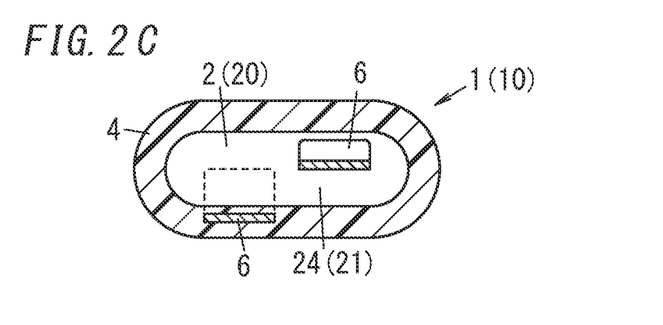
Figure 2D:
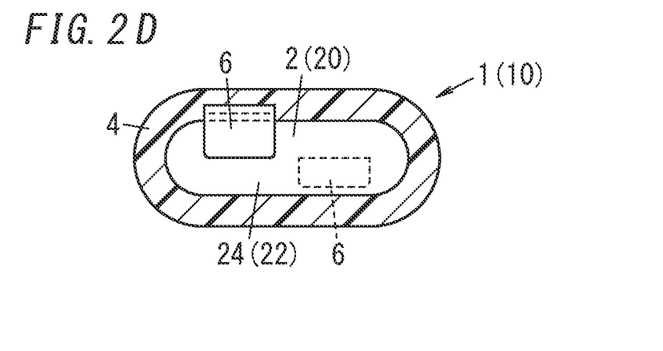
Figure 3A:
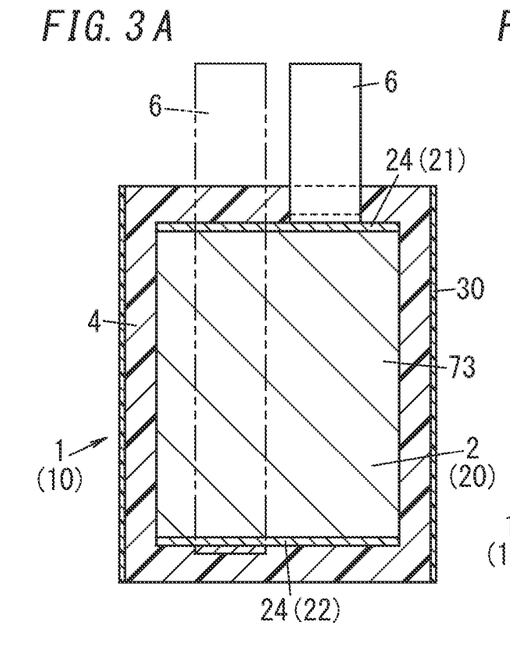
FIGS. 3A and 3B are sectional views of other embodiments of the electronic component according to the present embodiment.

FIG. 3A shows a capacitor 10 in which the location of a laminate 30 is different from that of FIG. 2A. The capacitor 10 includes the laminate 30 and an exterior resin layer 4. However, the laminate 30 is not in contact with a surface of a capacitor element 20 but covers a peripheral part of the exterior resin layer 4. In this case, the exterior resin layer 4 is located between the capacitor element 20 and the laminate 30. Thus, the exterior resin layer 4 is at a location closer to an electronic component element 2 (the capacitor element 20) than the laminate 30 is. The laminate 30 is located on a surface of the exterior resin layer 4.

Also in the capacitor 10, the capacitor element 20 is covered with the laminate 30 via the exterior resin layer 4, and therefore, the laminate 30 makes it difficult for moisture to reach the capacitor element 20, thereby reducing the moisture to be absorbed by the capacitor element 20 to improve the moisture resistance of the capacitor 10.

Figure 3B:
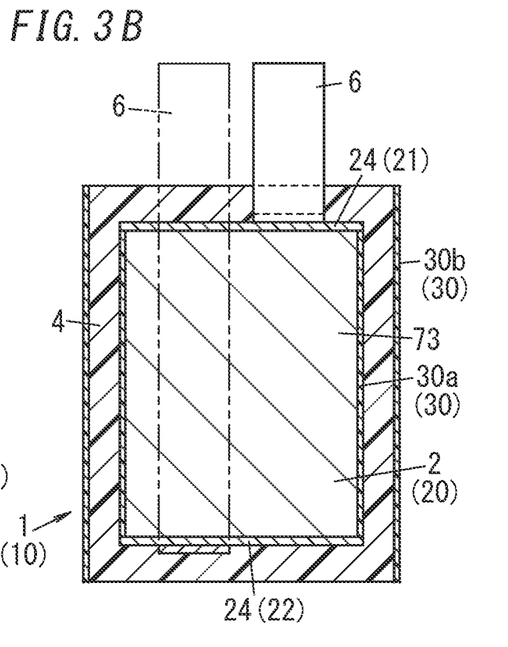

FIG. 3B shows a capacitor 10 in which the location of a laminate 30 is different from that of FIGS. 2A and 3A. The capacitor 10 includes the laminate 30 both on a surface of a capacitor element 20 and on a surface of an exterior resin layer 4. That is, the laminate 30 includes a first laminate 30a arranged in contact with the surface of the capacitor element 20 and a second laminate 30b arranged in contact with the surface of the exterior resin layer 4. Thus, the exterior resin layer 4 is disposed between the first laminate 30a and the second laminate 30b.

In the capacitor 10, the capacitor element 20 is covered with the first laminate 30a, the second laminate 30b, and the exterior resin layer 4. The two laminates 30 makes it difficult for moisture to reach the capacitor element 20 and further reduces the moisture to be absorbed by the capacitor element 20 to improve the moisture resistance of the capacitor 10.

(2-4) Manufacturing Method of Electronic Component (Capacitor)

The manufacturing method of the electronic component 1 includes a step of forming the electronic component element 2 and a step of winding the laminate 30 around at least part of the peripheral part of the electronic component element 2. When the electronic component 1 is the capacitor 10, the manufacturing method of the capacitor 10 includes a step of forming the capacitor element 20 and a step of winding the laminate 30 around at least part of the peripheral part of the capacitor element 20. The manufacturing method of the electronic component 1 or the capacitor 10 according to the present embodiment may further include a step of covering the capacitor element 20 with the exterior resin layer 4.

Figure 4A:
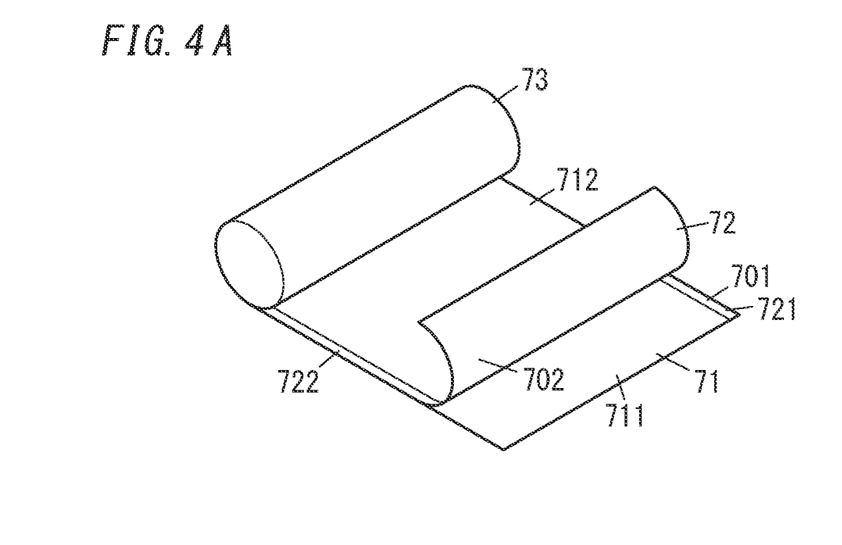
FIG. 4A is a view (perspective view) of one step in a manufacturing method of a wound capacitor element.
Figure 4B:
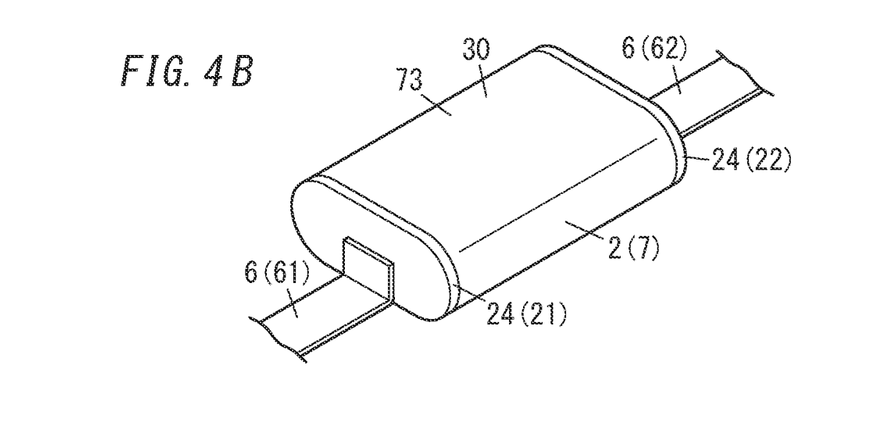
FIG. 4B is a perspective view of the wound capacitor element.

Manufacturing a wound capacitor element 7 which is the capacitor element 20 includes: a step of winding metallized films 71 and 72 into a wound body 73; a step of winding the laminate 30 around at least part of a peripheral part of the wound body 73; and a step of forming the external electrodes 24 by thermally spraying a metal material onto both ends of the wound body 73 having the laminate 30 wound therearound. Specifically, the wound capacitor element 7 can be manufactured as explained below.

First, a first metallized film 71 and a second metallized film 72 are prepared (see FIG. 4A). The first metallized film 71 includes a first dielectric film 701 and a first electrically conductive layer 711. The first dielectric film 701 is an elongated object. The first dielectric film 701 has one surface on which the first electrically conductive layer 711 is formed except for a first margin part 721. The first margin part 721 is a part where the first dielectric film 701 is exposed. The first margin part 721 is formed along one long side of the first dielectric film 701 to have a belt shape narrower than the first electrically conductive layer 711.

The second metallized film 72 is formed to have a similar configuration to the first metallized film 71. That is, the second metallized film 72 includes a second dielectric film 702 and a second electrically conductive layer 712. The second dielectric film 702 is an elongated object having the same width as the first dielectric film 701. The second dielectric film 702 has one surface on which the second electrically conductive layer 712 is formed except for a second margin part 722. The second margin part 722 is a part where the second dielectric film 702 is exposed. The second margin part 722 is formed along one long side of the second dielectric film 702 to have a belt shape narrower than the second electrically conductive layer 712.

The first dielectric film 701 and the second dielectric film 702 include the same type of resin as the base material layer 33 of the laminate 30. For example, the first dielectric film 701 and the second dielectric film 702 include polypropylene, polyethylene terephthalate, polyethylene naphthalate, polyphenyl sulfide, polystyrene, or the like. The first electrically conductive layer 711 and the second electrically conductive layer 712 are formed by, for example, a vapor deposition method or a sputtering method. The first electrically conductive layer 711 and the second electrically conductive layer 712 are made of, for example, aluminum, zinc, and magnesium.

As shown in FIG. 4A, the first metallized film 71 and the second metallized film 72 are then stacked on each other such that two long sides of the first metallized film 71 are aligned with two long sides of the second metallized film 72. Here, the first dielectric film 701 or the second dielectric film 702 lies between the first electrically conductive layer 711 and the second electrically conductive layer 712. In addition, the long side where the first margin part 721 is formed and the long side where the second margin part 722 is formed are on opposing sides. The first metallized film 71 and the second metallized film 72 stacked on each other in this way are wound into the wound body 73 which is circularly columnar. The wound body 73 winds up the laminate 30 onto an outer circumferential surface thereof, and thereby, the wound body 73 is covered with the laminate 30. At this time, the laminate 30 may be wound only once (by one turn) or a plurality of number of times. Then, a side surface of the wound body 73 is pressed from both sides and is processed to have an elongated circular cross-section (see FIG. 4B). Flattening in this way saves spaces. In this way, an element body 2a formed from the wound body 73 can be covered with the laminate 30.

As the external electrodes 24, a first external electrode 21 and a second external electrode 22 are then formed by metallikon (thermal spraying, metal splaying) at both ends of the wound body 73, thereby obtaining the wound capacitor element 7. The first external electrode 21 is electrically connected to the first electrically conductive layer 711 (first internal electrode). The second external electrode 22 is electrically connected to the second electrically conductive layer 712 (second internal electrode). The first electrically conductive layer 711 and the second electrically conductive layer 712 form a pair of internal electrodes. The first external electrode 21 and the second external electrode 22 are made of, for example, tin, zinc, or a metal material containing tin and zinc as a main components.

Then, as shown in FIG. 4B, a first bus bar 61 is electrically connected to the first external electrode 21, and a second bus bar 62 is electrically connected to the second external electrode 22. Examples of this connection method include solder welding, resistor welding, and ultrasonic wave welding. The first bus bar 61 and the second bus bar 62 are made of, for example, copper or a copper alloy to have a plate shape.

In the case of the wound capacitor element 7, the step of winding the metallized films 71 and 72 is followed by winding the laminate 30 around the wound body 73, and therefore, the steps are reasonable and can be simplified. Moreover, when metal scraps adhering to portions (e.g., the peripheral part of the capacitor element 20) except for locations where the external electrodes 24 are formed have to be removed after the step of thermally spraying the metal material, the base material layer 33 of the laminate 30 is wound around the peripheral part of the capacitor element 20 such that the base material layer 33 of the laminate 30 is located outermost, and therefore, the metal scraps adhering to the base material layer 33 are easily removable. Note that such metal scraps are removed by scrubbing and the like.

In contrast, a stacked capacitor element 8 which is the capacitor element 20 may be manufactured by, for example, the following method. First of all, first metallized films 81 and second metallized films 82 are prepared (see FIG. 5A).

Figure 5A:
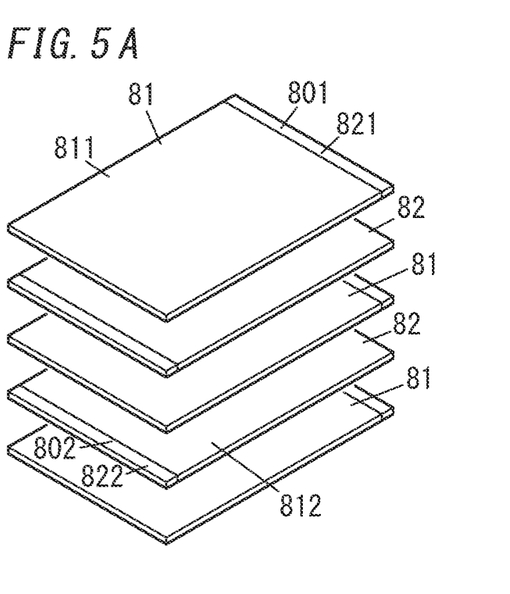
FIG. 5A is a view (perspective view) of one step in a manufacturing method of a stacked capacitor element.

Each first metallized film 81 includes a first dielectric film 801 and a first electrically conductive layer 811. The first dielectric film 801 has a rectangular shape. The first dielectric film 801 has one surface on which the first electrically conductive layer 811 is formed except for a first margin part 821. The first margin part 821 is formed along one side of the first dielectric film 801 to have a belt shape narrower than the first electrically conductive layer 811.

Each second metallized film 82 has a configuration similar to that of each first metallized film 81. That is, each second metallized film 82 includes a second dielectric film 802 and a second electrically conductive layer 812. The second dielectric film 802 has a rectangular shape having the same size as the first dielectric film 801. The second dielectric film 802 has one surface on which the second electrically conductive layer 812 is formed except for a second margin part 822. The second margin part 822 is formed along one side of the second dielectric film 802 to have a belt shape narrower than the second electrically conductive layer 812.

The first dielectric film 801 and the second dielectric film 802 include the same type of resin as the base material layer 33 of the laminate 30. For example, the first dielectric film 801 and the second dielectric film 802 include polypropylene, polyethylene terephthalate, polyethylene naphthalate, polyphenyl sulfide, polystyrene, or the like. The first electrically conductive layer 811 and the second electrically conductive layer 812 are formed by, for example, a vapor deposition method or a sputtering method. The first electrically conductive layer 811 and the second electrically conductive layer 812 are made of, for example, aluminum, zinc, and magnesium.

Figure 5B:
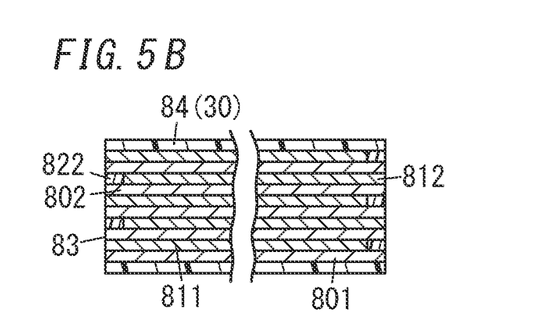
FIG. 5B is a view (sectional view) of one step in the manufacturing method of the stacked capacitor element.
Figures 5C, 5D:
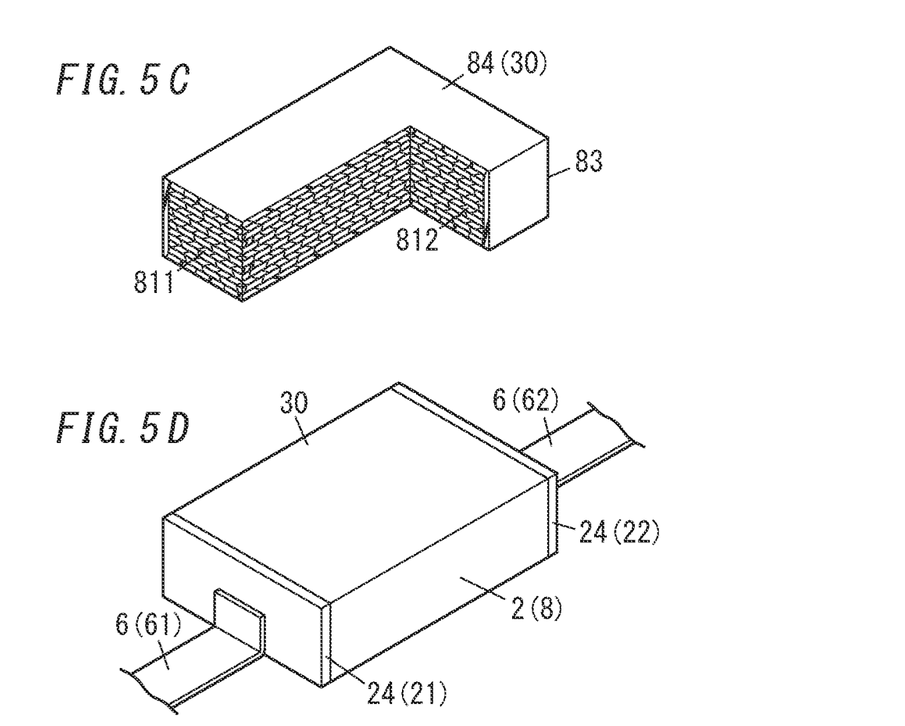
FIG. 5C is a partially cutaway perspective view of the stacked capacitor element of FIG. 5B.
FIG. 5D is a perspective view of the stacked capacitor element.

As shown in FIGS. 5A and 5B, the first metallized films 81 and the second metallized films 82 are then alternately stacked on each other while their four sides are aligned with each other. Here, the first dielectric film 801 or the second dielectric film 802 lies between the first electrically conductive layer 811 and the second electrically conductive layer 812. In addition, one side where the first margin part 821 is formed and one side where the second margin part 822 is formed are on opposing sides. In FIG. 5A, the first margin part 821 is arranged rearward, and the second margin part 822 is arranged frontward. Stacking and integrating the plurality of first metallized films 81 and the plurality of second metallized films 82 in this way together provides a laminate 83 as shown in FIGS. 5B and 5C. The laminate 83 is covered with a protection film 84 except for a front face and a rear face of the laminate 83. The protection film 84 is a film which is electrically insulating. The protection film 84 may be formed from the laminate 30.

Then, a first external electrode 21 and a second external electrode 22 are formed by metallikon (thermal spraying, metal splaying) respectively on the front face and the rear face of the laminate 83, thereby obtaining the stacked capacitor element 8 (see FIG. 5D). The first external electrode 21 is electrically connected to the first electrically conductive layers 811 (first internal electrodes). The second external electrode 22 is electrically connected to the second electrically conductive layers 812 (second internal electrodes). The first electrically conductive layer 811 and the second electrically conductive layer 812 form a pair of internal electrodes. The first external electrode 21 and the second external electrode 22 are made of, for example, zinc.

Thereafter, as shown in FIG. 5D, a first bus bar 61 is electrically connected to the first external electrode 21, and a second bus bar 62 is electrically connected to the second external electrode 22. Examples of this connection method include solder welding, resistor welding, and ultrasonic wave welding. The first bus bar 61 and the second bus bar 62 are made of, for example, copper or a copper alloy to have a plate shape.

After the capacitor element 20 is formed as described above, a step of forming the exterior resin layer 4 is performed. The step of forming the exterior resin layer 4 includes sealing, with a resin, the capacitor element 20 to which bus bars 6 have been connected, thereby forming the exterior resin layer 4. Examples of the resin include an epoxy-based resin, an unsaturated polyester resin, a polyimide resin, an urethane resin, and a silicone resin. Examples of a molding method for covering the capacitor element 20 include transformer molding, compression molding, and laminate molding. Moreover, in a case including the exterior resin layer 4, the capacitor element 20 may be housed and sealed. The exterior resin layer 4 is formed to cover the entirety of the capacitor element 20 except for connection parts of the capacitor element 20 to the bus bars 6. Each bus bar 6 has a tip end located on an outer side (on an opposite side from the capacitor element 20) of the exterior resin layer 4. After the exterior resin layer 4 is formed, the laminate 30 is provided on a surface of the exterior resin layer 4 as necessary.

In this way, the capacitor 10 including the laminate 30 as a barrier film is obtained.

(2-5) Variations

An example in which the electronic component is a capacitor has been described above, but the electronic component is not limited to this example. The present disclosure is applicable also to an example in which the electronic component is a passive component or an active component other than the capacitor. The passive component or the active component other than the capacitor respectively includes, in place of the capacitor element, a passive element or an active element according to the type of the electronic component.

An example in which the laminate 30 covers the wound body 73 before the first external electrode 21 and the second external electrode 22 are formed by metal splaying (metallikon, thermal spraying) has been described above, but this should not be construed as limiting. After the first external electrode 21 and the second external electrode 22 are formed, the wound body 73 may be covered with the laminate 30. In the case of covering peripheral parts of the first external electrode 21 and the second external electrode 22 with the laminate 30, the first external electrode 21 and the second external electrode 22 are formed on the wound body 73, and then, the wound body 73, the first external electrode 21, and the second external electrode 22 may be covered with the laminate 30.

Moreover, even in the case of covering peripheral parts of the first external electrode 21 and the second external electrode 22 with the laminate 30, the laminate 30 may cover the wound body 73 before the first external electrode 21 and the second external electrode 22 are formed. In this case, the width of the laminate 30 is made larger by 1 to 2 mm than the width of each of the metallized films 71 and 72 forming the wound body 73, and an end of the laminate 30 protrudes beyond an end face in the axial direction of the wound body 73. The first external electrode 21 and the second external electrode 22 are formed by thermally spraying metal onto the end face in the axial direction of the wound body 73 in a space surrounded by the end of the laminate 30.

(3) Summary

A laminate (30) of a first aspect includes a base material layer (33), an adhesive layer (32), and a clay layer (31). The base material layer (33) includes a crystalline resin. The adhesive layer (32) includes a resin different from the crystalline resin and is disposed on one face of the base material layer (33). The clay layer (31) is disposed on the adhesive layer (32) on the one face of the base material layer (33). The adhesive layer (32) has a viscosity development temperature of lower than or equal to 130° C.

This aspect has the advantage that the laminate (30) has a good water vapor barrier property due to the base material layer (33) including the crystalline resin and the adhesion between the base material layer (33) and the clay layer (31) is excellent due to the adhesive layer (32).

In a laminate (30) of a second aspect referring to the first aspect, the adhesive layer (32) includes an amorphous resin.

This aspect has the advantage that the adhesion between the base material layer (33) and the clay layer (31) is easily improved without thermal welding.

In a laminate (30) of a third aspect referring to the first aspect, the adhesive layer (32) includes a resin including a polarity group.

This aspect has the advantage that the adhesion between the base material layer (33) and the clay layer (31) is easily improved without thermal welding.

In a laminate (30) of a fourth aspect referring to any one of the first to third aspects, the crystalline resin is polypropylene.

This aspect has the advantages that the water vapor barrier property of the laminate (30) is improved.

In a laminate (30) of a fifth aspect referring to any one of the first to fourth aspects, the base material layer (33) is a biaxially oriented polypropylene film.

This aspect has the advantages that the water vapor barrier property of the laminate (30) is improved.

A laminate (30) of a sixth aspect referring to any one of the first to fifth aspects further includes an aluminum layer or a polyvinyl alcohol layer on the other face of the base material layer (33).

This aspect has the advantages that the water vapor barrier property of the laminate (30) is improved.

An electronic component (1) of a seventh aspect includes an electronic component element (2) and a barrier film covering at least part of a peripheral part of the electronic component element (2). The barrier film includes the laminate (30).

This aspect has the advantage that the laminate (30) reduces moisture reaching the electronic component element (2), thereby easily providing the electronic component (1) having high humidity resistance reliability.

A capacitor (10) of an eighth aspect is the electronic component (1) of the seventh aspect, and the electronic component element (2) of the electronic component (1) is a capacitor element (20).

This aspect has the advantage that the laminate (30) reduces moisture reaching the capacitor element (20), thereby easily providing the capacitor (10) having high humidity resistance reliability.

In a capacitor (10) of a ninth aspect referring to the eighth aspect, the capacitor element (20) includes a pair of metallized films (71, 72, 81, 82) each including a dielectric film (701, 702, 801, 802) and an electrically conductive layer (711, 712, 811, 812) on the dielectric film (701, 702, 801, 802), the pair of metallized films (71, 72, 81, 82) are wound such that the electrically conductive layer (711, 712, 811, 812) of one of the pair of metallized films (71, 72, 81, 82) and the electrically conductive layer (711, 712, 811, 812) of the other of the pair of metallized films (71, 72, 81, 82) face each other via the dielectric film (701, 702, 801, 802) of the one of the pair of metallized films (71, 72, 81, 82), and the dielectric film (701, 702, 801, 802) includes a same type of a resin as the crystalline resin included in the base material layer (33).

This aspect has the advantage that the capacitor (10) which is excellent in the electrical insulation property and the water vapor barrier property is obtained. Example (Examples 1 and 2)

As the clay material, Kunipia F (manufactured by KUNIMINE INDUSTRIES CO., LTD.) was used. As the binder, water-soluble nylon A-90 (manufactured by Toray Industries, Inc.) was used. The clay material, the binder, and a solvent were mixed together, thereby preparing a process solution (clay coating solution). The content of the process solution was 6 wt. % clay material and binder in total, 81 wt. % water, and 13 wt. % ethanol. The mixing ratio (ratio by weight) of the clay material and the binder is shown in Table 1.

Then, the polypropylene film (thickness 24 μm) including a base material layer and an adhesive layer was subjected to corona treatment, and thereafter, the process solution was applied to a surface of the adhesive layer by using an applicator and was then dried. The thickness of a clay layer after drying was 1 μm. Note that the adhesive layer is low melting point polypropylene, has a melting point of 130° C., and has a viscosity development temperature of 90° C. Moreover, drying conditions were changed for each examples as shown in Table 1.

Then, an adhesion evaluation (based on HS K 5600-5-6) of the clay layer was made. That is, cuts were made into the clay layer at 2 mm intervals, peeling of the clay layer by using a tape was attempted, and only cases where the clay layer was not peeled (classification 0) are denoted by "○", and other cases are denoted by "×".

(Comparative Examples 1 and 2)

An adhesion evaluation was made in a similar manner to that made in Examples 1 and 2 except that a polypropylene film (only a base material layer) including no adhesive layer was used.

TABLE 1

| | Mixing Ratio of Clay Material: Binder | Base Material Layer | Adhesive Layer | Natural Drying 1 Hour | 40° C. Drying 1 Hour | 60° C. Drying 1 Hour | 80° C. Drying 1 Hour | 100° C. Drying 1 Hour |
|---|---|---|---|---|---|---|---|---|
| Example 1 | 10:0 | PP Film | With Low Melting Point PP | ○ | ○ | ○ | ○ | ○ |
| Example 2 | 7:3 | | | ○ | ○ | ○ | ○ | ○ |
| Comparative Example 1 | 10:0 | | Without Low Melting Point PP | × | × | × | × | × |
| Comparative Example 2 | 7:3 | | | × | × | × | × | × |

As can be seen from Table 1, the adhesion of the clay layer is improved in Examples 1 and 2 including the adhesive layer as compared with the Comparative Examples 1 and 2 including no adhesive layer. Moreover, in Examples 1 and 2, the adhesion of the clay layer is secured by natural drying without heating. Further, in Examples 1 and 2, the adhesion of the clay layer is secured also when drying was performed at a temperature lower than or equal to the viscosity development temperature.

REFERENCE SIGNS LIST

1 Electronic Component
10 Capacitor
2 Electronic Component Element
20 Capacitor Element
30 Laminate
31 Clay Layer
32 Adhesive Layer
33 Base Material Layer
71, 72, 81, 82 Metallized Film
701, 702, 801, 802 Dielectric Film
711, 712, 811, 812 Electrically Conductive Layer

The invention claimed is:

1. A laminate comprising:
a base material layer that includes a crystalline resin;
an adhesive layer that includes a resin different from the crystalline resin and is disposed on one face of the base material layer; and
a clay layer that is disposed on the adhesive layer on the one face of the base material layer, wherein:
the base material layer includes a crystalline polypropylene,
the adhesive layer includes an amorphous polyolefin having a lower crystallinity than the crystalline polypropylene, and
the adhesive layer has a viscosity development temperature of lower than or equal to 130° C.

2. The laminate of claim 1, wherein
the adhesive layer includes a resin including a polarity group.

3. The laminate of claim 1, wherein
the base material layer is a biaxially oriented polypropylene film.

4. The laminate of claim 1, further comprising an aluminum layer or a polyvinyl alcohol layer on the other face of the base material layer.

5. An electronic component comprising:
an electronic component element; and
a barrier film covering at least part of a peripheral part of the electronic component element,
the barrier film including the laminate of claim 1.

6. A capacitor being the electronic component of claim 5, wherein
the electronic component element of the electronic component is a capacitor element.

7. The capacitor of claim 6, wherein
the capacitor element includes a pair of metallized films each including a dielectric film and an electrically conductive layer on the dielectric film,
the pair of metallized films are wound such that the electrically conductive layer of one of the pair of metallized films and the electrically conductive layer of the other of the pair of metallized films face each other via the dielectric film of the one of the pair of metallized films, and
the dielectric film includes a same type of a resin as the crystalline resin included in the base material layer.

8. The laminate of claim 2, wherein
the base material layer is a biaxially oriented polypropylene film.

9. The laminate of claim 2, further comprising an aluminum layer or a polyvinyl alcohol layer on the other face of the base material layer.

10. The laminate of claim 3, further comprising an aluminum layer or a polyvinyl alcohol layer on the other face of the base material layer.

* * * * *